United States Patent
Smith et al.

(10) Patent No.: US 9,212,968 B1
(45) Date of Patent: Dec. 15, 2015

(54) ONBOARD CALIBRATION SOURCE FOR SPECTRAL CALIBRATON OF A RADIOMETER

(71) Applicant: EXELIS, INC., McLean, VA (US)

(72) Inventors: David S. Smith, Fort Wayne, IN (US); David R. Wickholm, Beavercreek, OH (US); Ronald Joseph Glumb, Fort Wayne, IN (US); Sheldon David Stokes, Fort Wayne, IN (US); Glen Daniel White, Fort Wayne, IN (US)

(73) Assignee: Exelis, Inc., Herndon, VA (US)

( * ) Notice: Subject to any disclaimer, the term of this patent is extended or adjusted under 35 U.S.C. 154(b) by 290 days.

(21) Appl. No.: 14/012,202

(22) Filed: Aug. 28, 2013

(51) Int. Cl.
*G01C 21/02* (2006.01)
*H01J 3/14* (2006.01)
*G01M 11/00* (2006.01)
*H01L 31/167* (2006.01)

(52) U.S. Cl.
CPC .............. *G01M 11/00* (2013.01); *H01L 31/167* (2013.01)

(58) Field of Classification Search
CPC .............................. G01M 11/00; H01L 31/167
USPC ........ 250/203.4, 216; 359/599; 396/374–375; 348/340–342
See application file for complete search history.

(56) References Cited

U.S. PATENT DOCUMENTS

| 7,482,572 B1 * | 1/2009 | Galvin ........................... 250/216 |
| 7,576,346 B1 * | 8/2009 | Smith et al. ................ 250/559.1 |
| 7,873,257 B2 * | 1/2011 | Morgan ........................ 385/146 |
| 8,642,937 B1 * | 2/2014 | Bowen et al. .............. 250/203.4 |

* cited by examiner

*Primary Examiner* — Seung C Sohn
(74) *Attorney, Agent, or Firm* — RatnerPrestia

(57) ABSTRACT

A calibration device for a radiometer includes an integrating cavity and a honeycomb blackbody mounted to the integrating cavity. A plurality of emitters are mounted to the exterior rim of the integrating cavity for transmitting narrow band wavelengths of light into and out of the integrating cavity. A controller, selectively, activates one or more emitters to radiate a single narrow band wavelength of light during an ON period and turn OFF during another period. A plurality of reference detectors are also mounted to the exterior rim of the integrating cavity for measuring the intensity of each narrow band radiation outputted from the integrating cavity. The reference detectors are effective in determining changes in intensity output by each of the narrow band emitters from the integrating cavity. The measured changes in intensity outputted by the emitters are used to calibrate the radiometer with the changes traced back to a NIST standard.

20 Claims, 6 Drawing Sheets

ONBOARD CALIBRATION SOURCE FOR SPECTRAL CALIBRATON OF A RADIOMETER

FIELD OF THE INVENTION

The present invention is directed to energy calibration equipment used in spacecraft, and more particularly, to calibration equipment for remote sensing devices.

BACKGROUND OF THE INVENTION

Earth observing radiometers typically view the planet in separate solar (0.3-3 µm) and infra-red (3-100 µm) spectral channels. The solar channels measure the amount of sunlight reflected by the Earth, while the infra-red channels measure the thermal radiance emitted out to space. For the infra-red channels, onboard targets, like blackbodies, are used to calibrate the sensors. For the solar channels, typically a separate target, like a solar diffuser or an onboard lamp, is used to calibrate the sensors.

These Earth observing radiometers, or imagers are useful for remote sensing of atmospheric compositions, crop assessments, weather prediction and other types of monitoring activities. Satellite-based, remote sensors are able to measure properties of the atmosphere above the Earth, when their detector arrays are properly calibrated for radiometric response.

A method of calibrating the radiance measured by these remote sensors is to create a reference radiation using a known source of spectral radiance, such as the sun. The radiation from the sun is used as a reference signal which, in turn, provides a known radiance to a remote sensor for calibrating its detector array.

Conventionally, there are four different methods for calibrating the radiance measured by the sensors. One of these methods is the use of Calibration Light Source Assemblies (hereinafter "CLSA"). CLSAs use the sun as a source of illumination and provide a partial aperture illumination. A second method is the use of a Full Aperture Calibration Door (hereinafter "FACD"). An FACD provides a coating on the inner surface of a calibration door. During the calibration process, the door is opened, as shown in FIG. 1, and the coated inner surface reflects the sun towards the detector array of the radiometer. The sensor in FIG. 1 is represented schematically by a single lens 12 focusing an image onto a detector array 14. The sensor is calibrated by swinging a diffusely reflecting surface of a door 10, often a Lambertian surface, into a blocking position over the sensor aperture 16. The sun must be at a large angle to the sensor's line of sight, with solar radiation passing across the aperture, so that the Lambertian surface can fill the sensor's field of view (FOV) with diffusely reflected sunlight. Between calibration cycles the Lambertian surface must swing aside, clearing the line of sight, as shown by the arrow and dashed lines in FIG. 1.

Another method is the use of a Full-Aperture Calibration Surface (hereinafter "FACS"). In the FACS method, a medium or a coating is applied to a surface. The surface is then moved into position to reflect the sun as a source of illumination. Finally, another method that may be employed uses an On-board Calibration Source (hereinafter "OBCS"). In the OBCS method, incandescent lamps, or radiative black bodies are used to provide the illumination. The lamps or radiative black bodies are positioned in front of an aperture to a sensor such that they illuminate direct energy towards the sensor when calibration is required.

A satellite known as the Long Duration Exposure Facility (LDEF) has been recovered by the Space Shuttle after spending six years in low Earth orbit. The LDEF includes a telescope that has monitored solar radiation from the Earth. The telescope has been calibrated, as necessary, using an onboard tungsten lamp. FIG. 2 shows the change in spectral transmission of the LDEF telescope after recovery compared to before launch (spending 6 years in low Earth orbit).

Referring to the figure, three plots are shown of a ratio-to-witness samples (y-axis) versus wavelength (x-axis). One plot is for the change in the viewing characteristics of the LDEF telescope after 6 years in orbit; and another plot is for the change in the radiance characteristics of the onboard tungsten lamp after 6 years in orbit. A third plot is for the scattered radiance characteristics of a clear ocean. The figure shows that a telescope in low Earth orbit degrades primarily in the UV to blue spectral region; the degradation increases significantly at shorter wavelengths below 0.4 µm. The figure also shows that a tungsten lamp degrades significantly above 0.4 µm. It will also be appreciated that, as shown, the radiance scattered from a clear ocean (blue spectrum of sunlight) varies significantly as a function of wavelength.

The LDEF results shown in FIG. 2 lead to a conclusion that conventional onboard calibration sources, such as the lamps on board the Earth observing satellites of CERES and CLARREO have little to no calibrated standards that may be traceable to a NIST (National Institute of Standards and Technology) standard. This is especially true for radiance at visible wavelengths, as the radiance of the tungsten lamp shown in FIG. 2 has no spectral resolution below 0.4 µm. Conventional Earth observing solar channels tend to degrade in orbit with no means of monitoring the instrument changes. Thus, any biases and trends in both environmental and climate data records (EDRs and CDRs) released to the science community are incorrect; the trends represent instrument changes, rather than Earth climate changes.

As will be described, unlike the aforementioned deficiencies, the present invention provides an accurate system and method for calibrating a metrological instrument, such as an Earth viewing telescope, while it is orbiting the Earth.

SUMMARY OF THE INVENTION

To meet this and other needs, and in view of its purposes, the present invention provides a calibration device for a radiometer. The device includes a housing disposed in an orbiting satellite for passing light to an imaging device. Also included are a plurality of emitters disposed in the housing for transmitting light toward the imaging device; and a plurality of detectors disposed in the housing for receiving a portion of the light transmitted toward the imaging device. The emitters are configured to transmit narrow band wavelengths of light, and the detectors are configured to measure a change in radiance of the light transmitted toward the imaging device.

The emitters may include at least one of a blue emitting diode, a green emitting diode and a red emitting diode. The emitters may include at least one of a 445 nanometer light emitting diode (LED), a 665 nanometer LED, and a 980 nanometer LED. The emitters may include at least one of a 1.0 micron LED and a 1.5 micron LED. The detectors may include at least one of a silicon PIN diode and an InGaAs photo-diode. The detectors are configured to be calibrated by a standard in a ground laboratory, and the emitters are configured to monitor changes in the detectors when disposed in the orbiting satellite.

The calibration device also includes a honeycomb blackbody and an integrating cavity. The emitters are configured to radiate light into the integrating cavity. The integrating cavity is configured to reflect received light toward the honeycomb blackbody. The honeycomb blackbody is configured to pass the reflected light toward the imaging device.

The calibration device may also include a controller for pulsing each of the emitters ON/OFF. A respective emitter is configured to radiate a respective narrowband wavelength of visible light and thermal radiation during the respective emitter's ON time, and radiate thermal radiation during the respective emitter's OFF time.

Another embodiment of the present invention is a calibration device for a radiometer comprising:

(a) an integrating cavity for outputting received light, the integrating cavity including a semi-spherical surface terminating in a flat surface, (b) a honeycomb blackbody mounted to the flat surface for radiating infrared light, and (c) a plurality of emitters mounted to the semi-spherical surface for transmitting visible light into the integrating cavity, and (d) a radiometer is configured to selectively view the infrared light and the visible light during calibration;

(e) a plurality of detectors are mounted to the semi-spherical surface for detecting light outputted from the integrating cavity, in which the detectors measure a change in intensity of the light outputted from the integrating cavity.

Yet another embodiment of the present invention is a method of calibrating a telescope comprising the steps of:

(a) transmitting narrowband wavelengths of visible light from an integrating cavity, wherein the transmitted visible light is radiated from a respective diode and passed through a honeycomb blackbody;

(b) selectively configuring the telescope to view the transmitted visible light; and (c) monitoring the transmitted visible light from the integrating cavity using at least one reference detector, wherein the detector is configured to measure intensity change in a respective narrowband wavelength of light transmitted from the respective diode.

The method may include the steps of:

(d) pulsing the transmitted visible light ON/OFF, wherein each transmitted visible light is individually pulsed ON/OFF; and (e) monitoring each respective narrowband wavelength of light transmitted during an ON time and subtracting thermal radiation transmitted from the respective diode during an OFF time.

It is understood that the foregoing general description and the following detailed description are exemplary, but are not restrictive, of the invention.

BRIEF DESCRIPTION OF THE FIGURES

The invention may be best understood from the following detailed description when read in connection with the following figures.

DETAILED DESCRIPTION OF THE INVENTION

Figure 1:
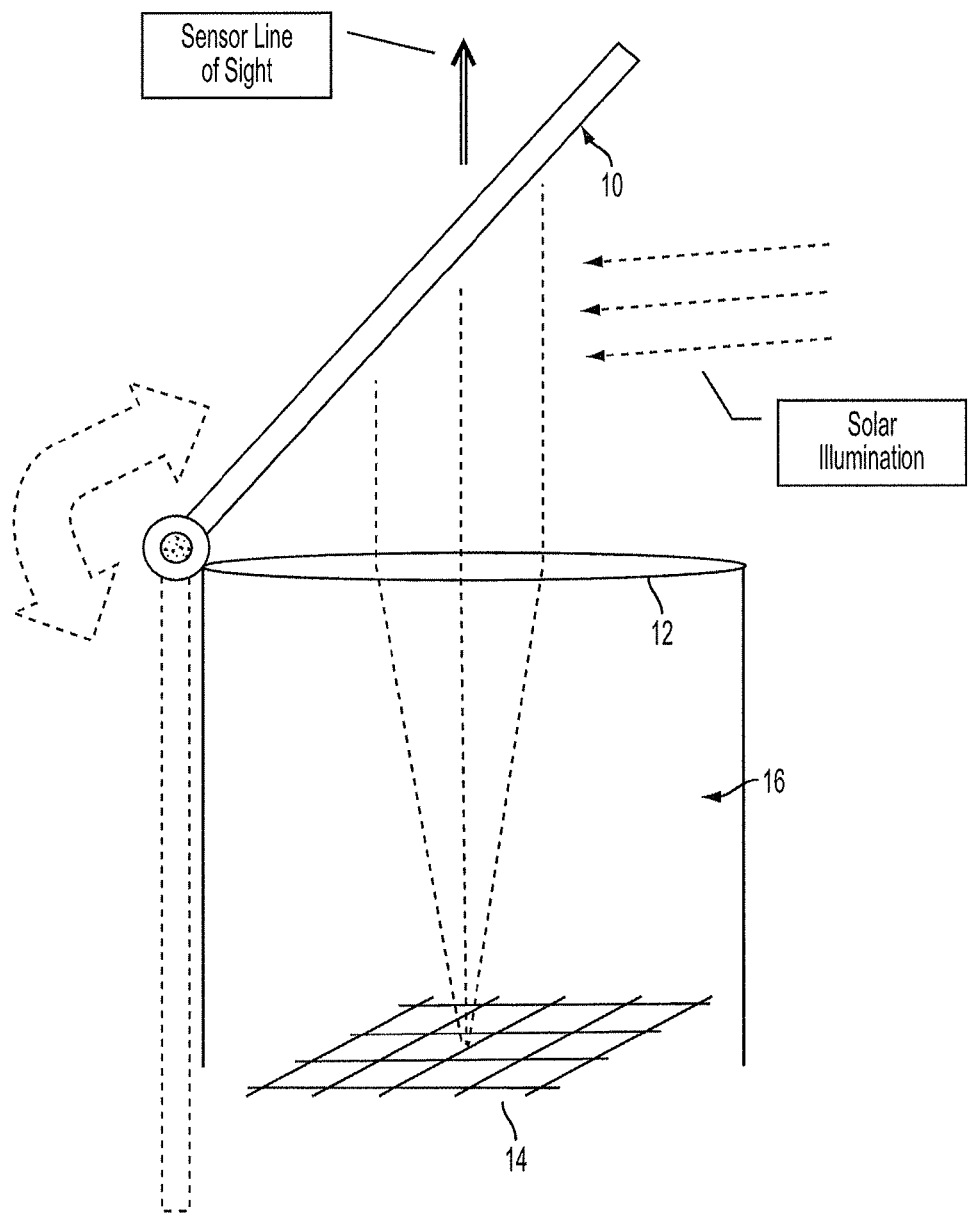
FIG. 1 is an example of a conventional calibration device using a diffusive surface on a door to reflect solar radiation into an imaging array of a radiometer, so that the radiometer may be calibrated during flight.
Figure 2:
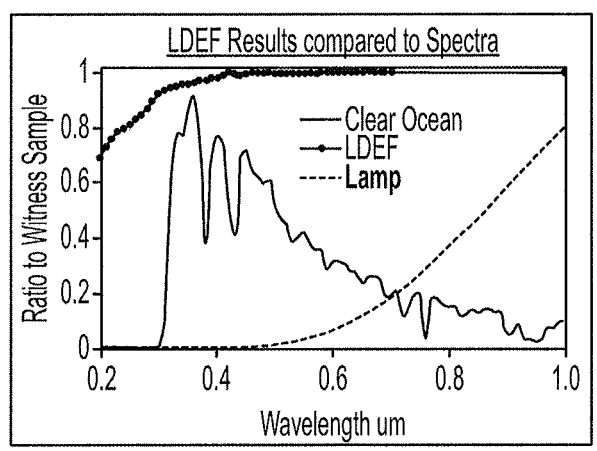
FIG. 2 is an example of spectral changes in transmission of a telescope after six years in orbit in comparison with radiance scattered from a clear ocean and radiance from an existing onboard tungsten lamp.

As will be explained, the present invention combines a honeycomb blackbody with an integrating cavity, for example a hemi-sphere, the latter held behind the honeycomb structure. Disposed around the periphery of the integrating cavity are laser diodes, or light emitting diodes (LEDs), each tuned to different wavelengths, which radiate light into the integrating cavity. The wavelengths may cover spectral ranges from the ultraviolet (UV)/blue to the near infra-red. The output radiance of the laser diodes, or LEDs may be traceable to NIST standards by calibrating the light emitters in a ground laboratory prior to launch.

Of course, it is possible that these light emitters may change in radiant output intensities after launch. For this reason, the present invention includes solid state reference detectors that are also disposed around the periphery of the integrating cavity for measuring the radiance changes from the various light emitters as their light is diffused by the integrating cavity. Such reference detectors may include solid state detectors such as silicon (PIN) diodes and indium gallium arsenide (InGaAs) photodiodes. They may also include tungsten bulbs, for example.

Referring first to FIG. 3A, there is shown an orbiting satellite including a housing 30. As shown, housing 30 includes an integrating hemi-sphere, generally designated as 31. The integrating hemi-sphere includes a spherical surface terminating in a flat surface. A honeycomb blackbody, generally designated as 32, is mounted to the flat surface of the integrating hemi-sphere. Several emitters are mounted about the spherical surface so that they may emit light into the integrating hemi-sphere. The emitters, designated as 33a through 33n, when turned ON, radiate light into the integrating hemi-sphere for eventual transmission through honeycomb blackbody 32. These emitters may include any type of emitter that radiates a known band surrounding a single wavelength or multiple wavelengths.

Several reference detectors, two of which are designated 34a and 34b, are shown disposed on the spherical surface of integrating hemi-sphere 31. These reference detectors are configured to measure changes in the radiance output of light transmitted as an output from the integrating hemi-sphere by each of the multiple emitters 33a through 33n. These reference detectors may include any type of detector that can effectively detect radiation within the wavelength bands of the radiating emitters disposed around the periphery of the integrating cavity.

Figure 3:
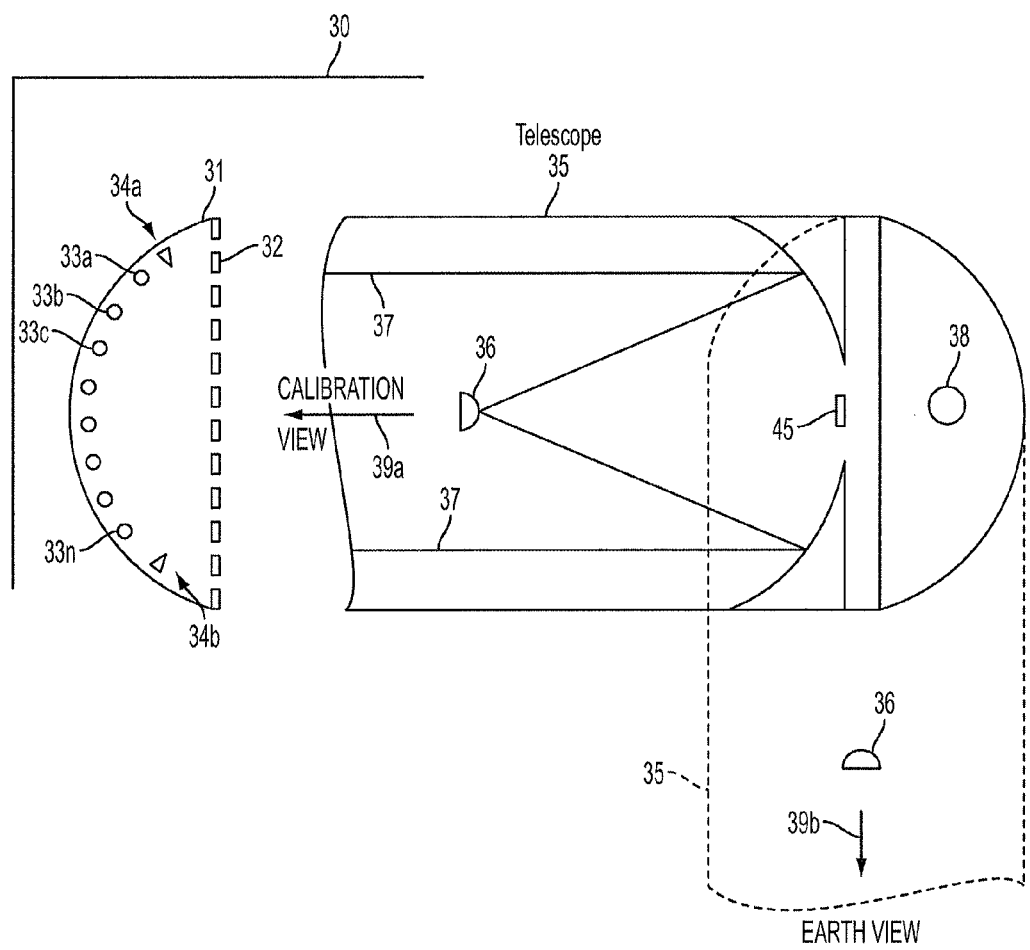
FIG. 3 is a housing in a satellite including an onboard calibration device for calibrating an imaging array of a telescope, in accordance with an embodiment of the present invention.

FIG. 3 also shows telescope 35 which includes mirrors 36 (only one mirror is shown) receiving rays of light 37 in two modes. One mode, a normal operating mode, is provided when viewing the Earth (as an example). The other mode, a calibration mode, is provided when viewing the integrating hemi-sphere. The normal mode is designated as 39b and the calibration mode is designated as 39a. Telescope 35 is pivoted on gimbals, which are schematically represented by a pivot point 38 for moving the telescope into a calibration view 39a, or a normal operational view 39b.

The integrating hemi-sphere 31 (shown as an example of many other possible integrating cavities) is configured to combine light from the multiple LED sources by mixing the light in an optical cavity having a reflective interior surface (not labeled). The optical cavity may be formed of a diffusely reflective plastic material having diffuse reflective characteristics. The optical cavity includes an aperture at the flat surface (not labeled) of the integrating hemi-sphere for allowing emission of the combined light energy through the honeycomb blackbody 32.

The optical cavity is effective in combining the radiant energy from the various emitters. For example, the radiant energy from a combination of emitters outputting the same wavelength of light may be combined in the optical cavity. One emitter or multiple emitters may be turned ON at the same time, so that the output provided by the integrating hemi-sphere is a combined intensity of the radiant energies from each separate emitter.

The emitters shown in FIG. 3 are configured to transmit narrow band wavelengths of light in the visible, ultraviolet and infra-red spectral regions. The emitters 33a through 33n may include at least one blue emitting diode, a green emitting diode and a red emitting diode. The emitters may also include at least one of a 445 nanometer (nm) LED, a 665 nm LED and a 980 nm LED. The emitters may also include at least one of a 1.0 um LED and a 1.5 um laser. It will be appreciated, however, that more than one LED providing the same wavelength of light may be disposed at various positions around the periphery of the integrating hemi-sphere. For example, there may be one set of two or more LEDs providing a first predetermined narrow band width of light and another set of two or more LEDs providing a second predetermined narrow band width of light. It will be understood that the specific emitters included in the above description are intended as examples only, since any emitter having a desired narrow band width of light may be used by the present invention.

As will be explained, the present invention sequentially emits one narrow band wavelength of light at any one calibration interval. The one narrow band wavelength of light, however, may be composed from one or more emitters having similar spectral characteristics. Thus, for example, one or more blue diodes may be turned ON simultaneously to radiate spectral energy from the integrating hemi-sphere toward a detector array 45 disposed in telescope 35. In this manner, only the blue spectral energy is used to calibrate the telescope during a first calibration interval. All other diodes emitting other wavelengths are turned OFF during the first calibration interval. Next, for example, one or more red diodes may be turned ON simultaneously to radiate spectral energy from the integrating hemi-sphere for calibrating the telescope during a second calibration interval. All other diodes emitting wavelengths outside of the red spectral energy are turned OFF during the second calibration interval. This process is repeated for other spectral wavelengths of interest by sequentially turning ON one specific narrow band emitter at a time and turning OFF the remaining emitters having spectral radiation different from the one specific narrow band emitter.

The reference detectors 34a and 34b, as examples, may each include at least one silicon PIN diode and at least one InGaAs photo-diode. Although only one of each reference detector is shown in the figure, nevertheless, it will be understood that more than one reference detector providing the same band width coverage may be disposed at various positions around the periphery of the integrating cavity, such as the integrating hemi-sphere. For example, there may be one set of two or more reference detectors providing a first predetermined band width of detection and another set of two or more reference detectors providing a second predetermined band width of detection.

Figure 4A:
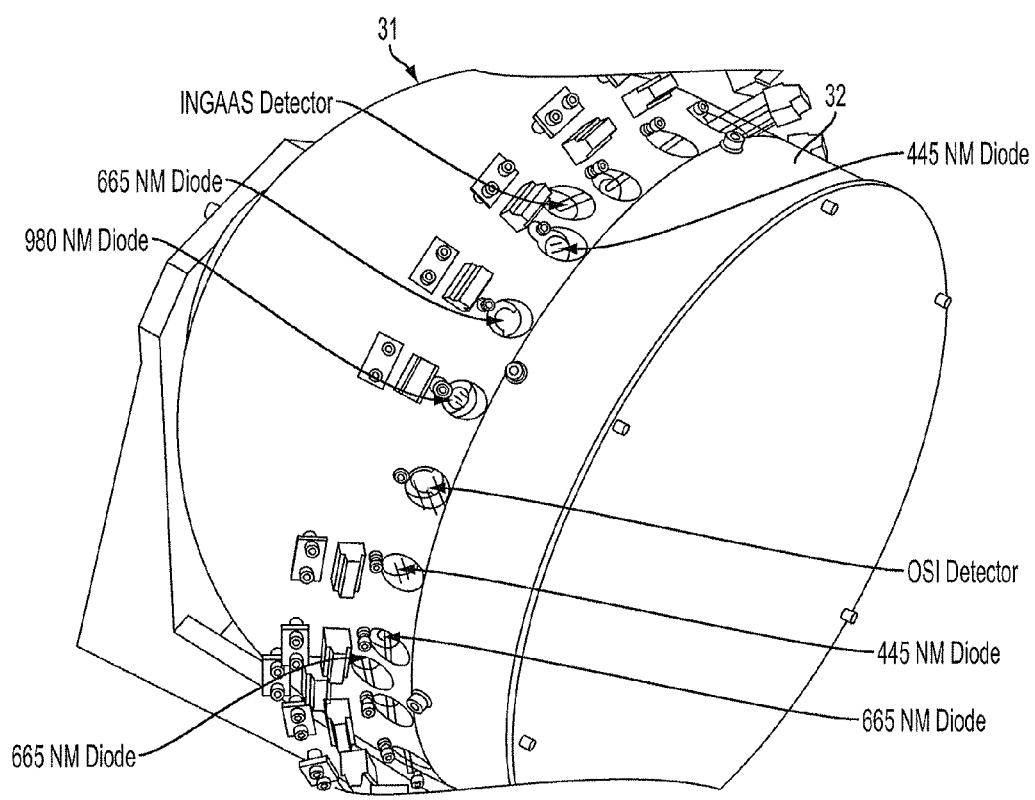
FIGS. 4A, 4B and 4C are pictorials of an integrating hemi-sphere (provided as an example) with a honeycomb blackbody including emitters and reference detectors disposed about the integrating hemi-sphere and a controller for selectively pulsing the emitters ON and OFF, in accordance with an embodiment of the present invention.
Figure 4B:
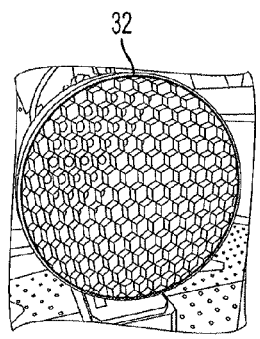
Figure 4C:
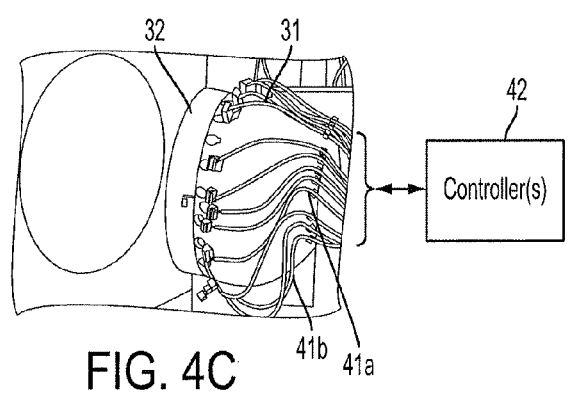

An example of an integrating hemi-sphere 31 and an attached honeycomb blackbody 32 is shown in FIGS. 4A, 4B and 4C. The FIG. 4A shows various source emitters and reference detectors disposed around the rim of integrating hemi-sphere 31. FIG. 4B shows a front view of the honeycomb blackbody which allows radiation from the integrating hemi-sphere to pass into telescope 35. FIG. 4C shows multiple cables attached between a controller 42 and the emitters and reference detectors. These multiple cables (two of which are designated as 41a and 41b) are coupled to controller 42. The controller 42 may be one or more controllers configured to activate the emitters and reference detectors during calibration of an imaging array, such as telescope 35.

Figure 5:
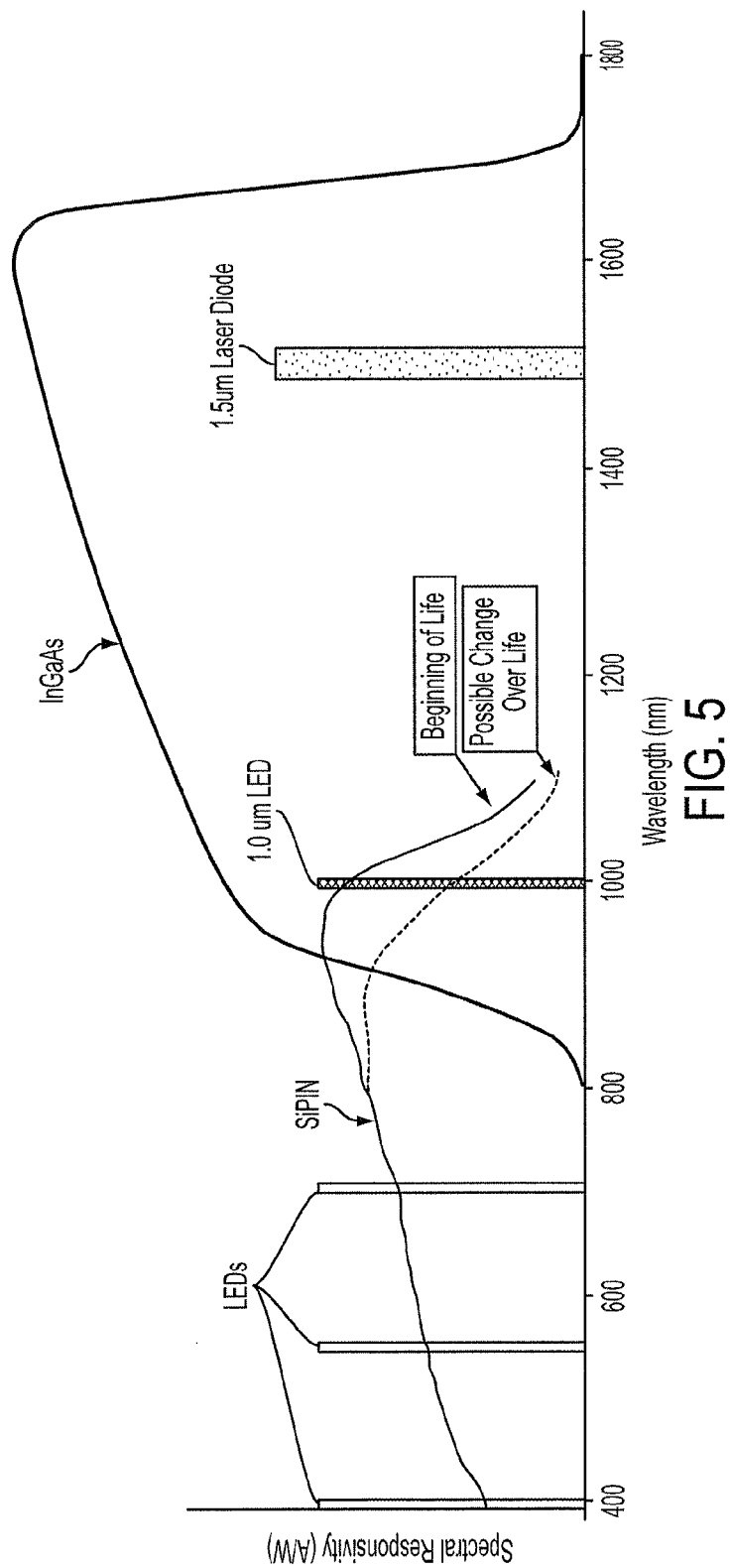
FIG. 5 shows examples of various narrow band emitters and various reference detectors that may be used by the present invention to calibrate an onboard radiometer during flight.

Referring next to FIG. 5, there is shown an example of the spectral response of various emitters, which may be included in housing 30 of the satellite. The emitters, shown for purpose of providing examples, include three different LEDs having spectral emissions below 700 nm, a 1.0 um LED and a 1.5 um laser diode. Thus, in this example, four different narrow band emitters are mounted on the integrating hemi-sphere. It will be understood that more than one of each emitter may be disposed on the periphery of integrating hemi-sphere 31. Other narrow band emitters may also be used, for example, a tungsten bulb may be used to radiate into the integrating cavity of the present invention.

Also shown in FIG. 5 and for purpose of showing examples are two different reference detectors spanning a wavelength region from 400 nm through 1700 nm. The first reference detector, namely the silicon PIN diode, spans from 400 nm through 1000 nm. Two different spectral response curves are shown for the silicon PIN diode, one existing before launch and the other existing after several years of diode lifetime aging. It will be appreciated that the silicon PIN diode does not change in spectral response during its lifetime between 400 nm and 800 nm. The second reference detector, namely the InGaAs diode, shows a spectral response between 800 nm through 1700 nm. It is assumed that the InGaAs diode also does not change in its spectral response during its operational lifetime.

Since the silicon PIN diode does not degrade during its lifetime in spectral regions below 800 nm (the visible band), the silicon PIN diode may be used to track changes in the spectral response of the three LED emitters radiating energy below 700 nm. Thus, the silicon PIN diode may be used as a reference detector in housing 30 of the satellite, such as reference detector 34a or reference detector 34b. In addition, the InGaAs detector may be used as a reference detector to monitor changes in any near infra-red LED emitter outputs. Accordingly, the present invention provides multiple narrow band source emitters, which may have changes in their spectral response, along with multiple reference detectors, which do not change in their spectral response, for calibrating an imaging device while in orbit. By measuring the changes in the spectral response of the narrow band emitters, the present invention provides NIST traceable sources (emitters) at visible and near infra-red wavelengths for calibrating solar channels within a single housing package.

The radiance remains NIST traceable back to ground calibration using the reference detectors. The solar wavelength light passes through the holes in the blackbody honeycomb structure. One at a time, the different color LEDs or laser diodes are activated to transmit a respective narrow band wavelength into the Earth observing telescope. In order to separate solar and infrared calibration of the various channels, the LED/laser diodes are pulsed ON and OFF so that thermal output from the semiconductor devices can be removed (note that the integrating hemi-sphere has an IR emissivity of around 0.5).

Such a combined solar and infra-red calibration target is ideal for large aperture Earth observation instruments and climate instruments, such as CERES and CLARREO that are needed in the future.

The calibration procedure will now be described. During calibration, the Earth viewing telescope, for example, is pivoted to receive narrow band wavelengths of light from integrating hemi-sphere 32, as shown in FIG. 3. A single narrow band wavelength of light from one or more emitters (33a-33n) is turned ON, one at a time. As an example, if three emitters, each radiating a blue wavelength, are available, then all three blue emitters may be turned ON simultaneously, so that the same blue wavelength of light is transmitted from integrating hemi-sphere 31 into the telescope. These blue emitters may also be simultaneously pulsed ON and OFF. A reference detector (34a or 34b) is also turned ON to measure the intensity of the same blue wavelength of light.

As an emitter(s) radiating a wavelength of λ is pulsed ON and OFF, the reference detector measures two different signals at the wavelength of λ, namely, Ve(λ) and Vr(λ). The first signal, Ve(λ) represents the signal measured by the reference detector during the ON time of the respective emitter(s). The signal Vr(λ) represents the signal measured by the reference detector during the OFF time of the respective emitter(s).

Having the signals on the ON time of the emitter and the OFF time of the emitter is effective in determining the change in gain of the Earth viewing detector array at the specific wavelength. The change in gain may be found by using the following expression:

$$Ge(\lambda)^{INFLIGHT} = Ve(\lambda)^{INFLIGHT} \times \frac{Vr(\lambda)^{GROUND}}{Vr(\lambda)^{INFLIGHT}} \times Ge(\lambda)^{GROUND} \quad (1)$$

where:

$Ge(\lambda)^{INFLIGHT}$=Inflight gain of the Earth viewing detector array at wavelength λ;

$Ve(\lambda)^{INFLIGHT}$=Inflight measured signal intensity of emitter(s) during ON time at wavelength λ;

$Vr(\lambda)^{GROUND}$=Ground measured signal intensity of emitter(s) on the ground prior to launch;

$Vr(\lambda)^{INFLIGHT}$=Inflight measured signal intensity of emitter(s) during OFF time at wavelength λ; and $Ge(\lambda)^{GROUND}$=Ground gain prior to launch of the Earth viewing detector array at wavelength λ.

Changes in the gain of the Earth viewing detector array in the infra-red region may also be calibrated by the present invention with the following expression using the honeycomb blackbody radiation and the LED emitters turned OFF:

$$Ge(\lambda_{IR})^{INFLIGHT} = \frac{Ve(\lambda_{IR})^{INFLIGHT}}{\varepsilon \sigma T_{BB}^4} \quad (2)$$

where:

$Ge(\lambda_{IR})^{INFLIGHT}$=Inflight gain of the Earth viewing detector array in the infra-red wavelength region;

$Ve(\lambda_{IR})^{INFLIGHT}$=Inflight measured signal intensity due to radiation of the honeycomb blackbody structure;

ε=Effective cavity emissivity; and $T_{BB}$=Temperature of honeycomb blackbody.

The infra-red changes in the detector array of the telescope is ascertained by using the radiation provided through the honeycomb blackbody structure when the emitters in the integrating hemi-sphere are completely turned OFF.

The narrow band sources and reference detectors allow monitoring of changes to an Earth viewing telescope, such that the changes may be accounted for in the measurements released from the EDR/CDR. The present invention allows for narrow-band NIST traceable sources at visible wavelengths to calibrate solar channels in the same package as an IR calibration target using a blackbody.

Although the invention is illustrated and described herein with reference to specific embodiments, the invention is not intended to be limited to the details shown. Rather, various modifications may be made in the details within the scope and range of equivalents of the claims and without departing from the invention. For example, optical cavities other than the integrating hemi-sphere may be sued by the present invention. Such optical cavities may take the shape of a sphere, a cone, or a cylinder terminated in a cone or half sphere. In addition, other LEDs, lasers, or emitters may be used by the present invention than the emitters explicitly described herein. Furthermore, other reference detectors may be used by the present invention than the reference detectors explicitly described herein.

What is claimed:

1. A calibration device for a radiometer comprising:
a housing disposed in an orbiting satellite for passing light to an imaging device,
a plurality of emitters disposed in the housing for transmitting light toward the imaging device, and
a plurality of detectors disposed in the housing for receiving a portion of the light transmitted toward the imaging device,
wherein the emitters are configured to transmit narrow band wavelengths of light in the visible spectral region, and
the detectors are configured to measure a change in radiance of the light transmitted toward the imaging device.

2. The calibration device of claim 1 wherein
the imaging device includes an Earth observation instrument including a telescope.

3. The calibration device of claim 1 wherein
the emitters include at least one of a blue emitting diode, a green emitting diode and a red emitting diode.

4. The calibration device of claim 1 wherein
the emitters include at least one of a 445 nanometer light emitting diode (LED), a 665 nanometer LED, and a 980 nanometer LED.

5. The calibration device of claim 1 wherein
the emitters include at least one of a 1.0 micron LED and a 1.5 micron LED.

6. The calibration device of claim 1 wherein
the detectors include at least one of a silicon PIN diode and an InGaAs photo-diode.

7. The calibration device of claim 1 wherein
the detectors are configured to be calibrated by a standard in a ground laboratory, and
the emitters are configured to monitor changes in the detectors when disposed in the orbiting satellite.

8. The calibration device of claim 7 wherein
the emitters include an LED transmitting light in the visible spectrum having a wavelength below 800 nanometers, and
the detectors include a silicon PIN diode.

9. The calibration device of claim 1 further comprising:
a honeycomb blackbody and an integrating cavity,
wherein the emitters are configured to radiate light into the integrating cavity,
the integrating cavity is configured to reflect received light toward the honeycomb blackbody, and
the honeycomb blackbody is configured to pass the reflected light toward the imaging device.

10. The calibration device of claim 9 further comprising:
a controller for pulsing each of the emitters ON/OFF,
wherein a respective emitter is configured to radiate a respective narrowband wavelength of visible light and thermal radiation during the respective emitter's ON time, and
configured to radiate thermal radiation during the respective emitter's OFF time.

11. The calibration device of claim 9 wherein
the honeycomb blackbody is configured to radiate infrared light toward the imaging device.

12. The calibration device of claim 1 wherein
the imaging device is configured to view the Earth, and
the imaging device is configured to view the housing including the light transmitted from each of the emitters.

13. A calibration device for a radiometer comprising:
an integrating cavity for outputting received light, the integrating cavity including a semi-spherical surface terminating in a flat surface,
a honeycomb blackbody mounted to the flat surface for radiating infrared light, and
a plurality of emitters mounted to the semi-spherical surface for transmitting visible light into the integrating cavity,
wherein the radiometer is configured to selectively view the infrared light and the visible light during calibration of the radiometer.

14. The calibration device of claim 13 further comprising:
a plurality of detectors mounted to the semi-spherical surface for detecting light outputted from the integrating cavity,
wherein the detectors measure a change in intensity of the light outputted from the integrating cavity.

15. The calibration device of claim 14 wherein
the emitters include at least one of a blue wavelength LED, a green wavelength LED, a red wavelength LED, a 1.0 micron wavelength LED and a 1.5 micron laser diode, and
the detectors include at least one of a silicon PIN diode and an InGaAs detector.

16. The calibration device of claim 14 wherein
the radiometer includes an Earth viewing instrument, and
the instrument is positioned to view the visible and infrared light during calibration.

17. The calibration device of claim 14 further comprising:
a controller for pulsing each of the emitters ON/OFF,
wherein during an ON time of a respective emitter, the radiometer views visible and infrared light, and
during an OFF time of the respective emitter, the radiometer views infrared light.

18. The calibration device of claim 13 wherein
the radiometer is an Earth viewing instrument, and
the emitters are disposed in an Earth orbiting satellite.

19. A method of calibrating a telescope comprising the steps of:
transmitting narrowband wavelengths of visible light from an integrating cavity, wherein the transmitted visible light is radiated from a respective diode and passed through a honeycomb blackbody;
selectively configuring the telescope to view the transmitted visible light; and
monitoring the transmitted visible light from the integrating cavity using at least one reference detector, wherein the detector is configured to measure intensity change in a respective narrowband wavelength of light transmitted from the respective diode.

20. The method of claim 19 including the steps of:
pulsing the transmitted visible light ON/OFF, wherein each transmitted visible light is individually pulsed ON/OFF; and
monitoring each respective narrowband wavelength of light transmitted during an ON time and subtracting thermal radiation transmitted from the respective diode during an OFF time.

* * * * *

UNITED STATES PATENT AND TRADEMARK OFFICE
CERTIFICATE OF CORRECTION

PATENT NO. : 9,212,968 B1
APPLICATION NO. : 14/012202
DATED : December 15, 2015
INVENTOR(S) : David S. Smith et al.

It is certified that error appears in the above-identified patent and that said Letters Patent is hereby corrected as shown below:

On the Title Page, Item (54), and in the Specification, Col. 1, correct the title to read as follows:
--ONBOARD CALIBRATION SOURCE FOR SPECTRAL CALIBRATION OF A RADIOMETER--.

Signed and Sealed this
Twelfth Day of April, 2016

Michelle K. Lee
*Director of the United States Patent and Trademark Office*